(12) United States Patent
Yamamoto et al.

(10) Patent No.: US 10,436,371 B2
(45) Date of Patent: *Oct. 8, 2019

(54) PIPE STRUCTURE AND AIRCRAFT

(71) Applicant: MITSUBISHI AIRCRAFT CORPORATION, Aichi (JP)

(72) Inventors: Hiroyuki Yamamoto, Tokyo (JP); Tadahiko Suzuta, Tokyo (JP); Kei Takao, Aichi (JP); Ichiro Maeda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 460 days.

This patent is subject to a terminal disclaimer.

(21) Appl. No.: 14/979,972

(22) Filed: Dec. 28, 2015

(65) Prior Publication Data
US 2016/0238180 A1    Aug. 18, 2016

(30) Foreign Application Priority Data
Feb. 18, 2015    (JP) .................... 2015-029571

(51) Int. Cl.
*F16L 55/07*    (2006.01)
*F17D 5/02*    (2006.01)
*G01M 3/00*    (2006.01)

(52) U.S. Cl.
CPC ............. *F16L 55/07* (2013.01); *F17D 5/02* (2013.01); *G01M 3/00* (2013.01); *F16L 2201/30* (2013.01)

(58) Field of Classification Search
CPC .......... G01M 3/002; G01M 3/18; G01M 3/22; F16L 55/168; F16L 23/04; F16L 55/07
See application file for complete search history.

(56) References Cited

U.S. PATENT DOCUMENTS

| | | | | |
|---|---|---|---|---|
| 4,750,189 A | * | 6/1988 | Lancaster | F17D 5/04 374/4 |
| 5,176,025 A | * | 1/1993 | Butts | G01M 3/045 73/40.5 R |
| 7,921,694 B2 | * | 4/2011 | Buhring | G01M 3/40 73/40 |

(Continued)

FOREIGN PATENT DOCUMENTS

| | | |
|---|---|---|
| JP | S57-113328 A | 7/1982 |
| JP | S57-146040 U | 9/1982 |

(Continued)

OTHER PUBLICATIONS

Japanese Office Action for Application No. 2015-029571, dated Nov. 6, 2018.

*Primary Examiner* — David Z Huang
(74) *Attorney, Agent, or Firm* — Pearne & Gordon LLP

(57) ABSTRACT

The present invention provides a pipe structure including: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; and a line-shaped sensor that passes a position corresponding to each of the plurality of vents, and is sensitive to a temperature or a concentration of the gaseous body outside the cover, wherein the sensor includes a range in which the sensor rises upward from the position corresponding to the vent.

16 Claims, 9 Drawing Sheets

(56) References Cited

U.S. PATENT DOCUMENTS

| | | | | |
|---|---|---|---|---|
| 8,826,942 B2* | 9/2014 | Millet | ............... | B64D 13/00 138/104 |
| 2009/0188300 A1* | 7/2009 | Gualtieri | ............ | F02D 41/1466 73/28.01 |
| 2012/0018014 A1* | 1/2012 | Fernandes | ............ | F16L 23/006 137/561 A |
| 2013/0248039 A1 | 9/2013 | Bourlart | | |
| 2016/0238179 A1* | 8/2016 | Yamamoto | ............... | F17D 5/02 |

FOREIGN PATENT DOCUMENTS

| | | |
|---|---|---|
| JP | H05-018848 A | 1/1993 |
| JP | H05-223657 A | 8/1993 |
| JP | 2002-106800 A | 4/2002 |
| JP | 2009-511884 A | 3/2009 |
| JP | 2010-230165 A | 10/2010 |
| WO | 2007/042277 A1 | 4/2007 |

\* cited by examiner

FIG. 6A
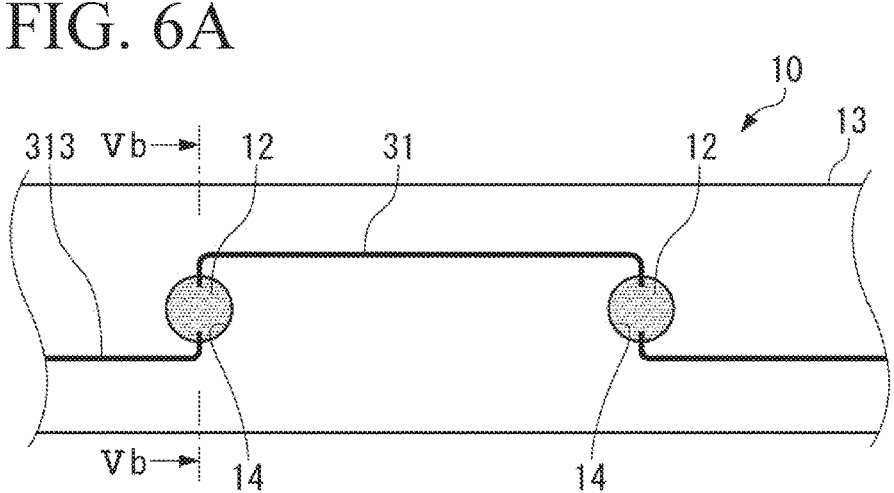
FIG. 6B
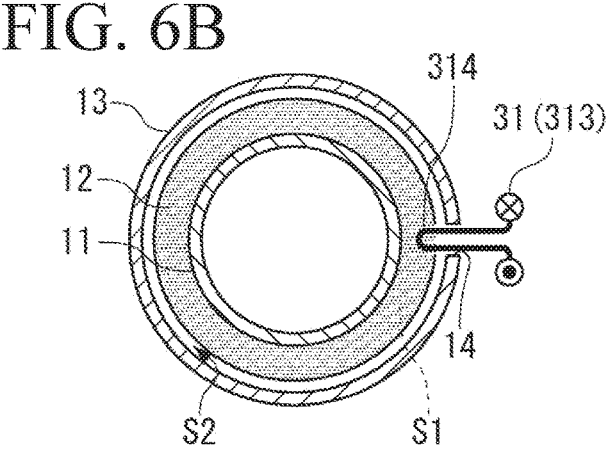
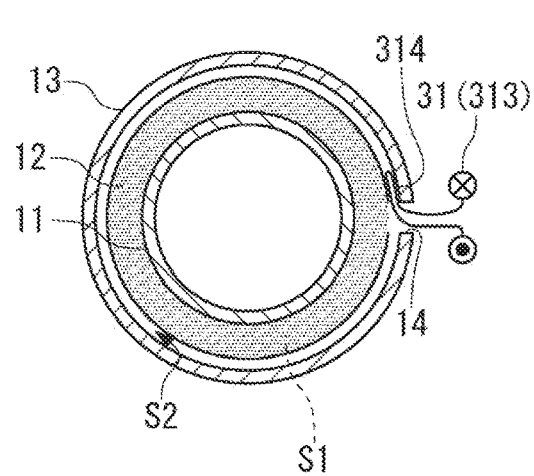
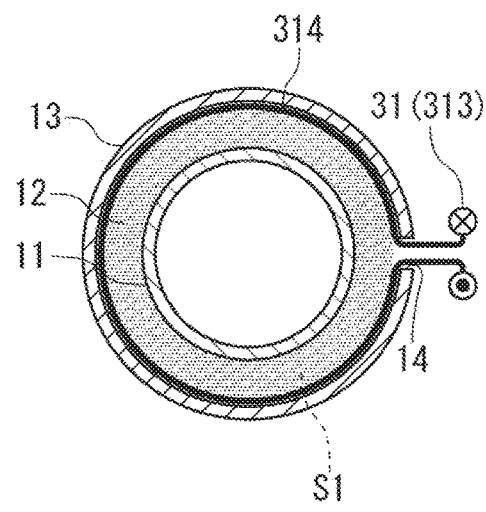
FIG. 6C  FIG. 6D

PIPE STRUCTURE AND AIRCRAFT

BACKGROUND OF THE INVENTION

Field of the Invention

The present invention relates to a pipe structure, and an aircraft including the pipe structure.

Description of the Related Art

An airframe of aircraft is provided with a pipe through which high-temperature bleed air from an engine flows.

For the purpose of weight saving of aircraft, the bleed air pipe is formed to be relatively thin-walled. Thus, there is a possibility that a leak of the bleed air occurs with cracks or corrosion being caused when the bleed air pipe is used over a long period of time.

In order to detect the leak from the bleed air pipe, an arrangement has been proposed which detects a leak by transmitting high-frequency radiation coupled to a bleed air pipe from a transmitting device to cause the high-frequency radiation to propagate along the bleed air pipe, receiving radiation propagating to the outside from a crack or the like of the bleed air pipe, and performing evaluation (National Publication of International Patent Application No. 2009-511884).

In order to detect the leak from the bleed air pipe, a plurality of vent holes from which the leaking bleed air flows out to the outside are formed in a cover that covers the bleed air pipe at intervals in a length direction of the pipe. A line-shaped sensor whose temperature is increased by the bleed air flowing out from the vent holes is provided so as to sequentially pass by the vent holes. The leak can be detected based on electrical resistance of the sensor that is changed when the temperature is increased.

The bleed air pipe and the sensor are arranged in a narrow space that is prepared within a main wing or a fuselage, and are mounted to a peripheral member by a bracket.

Positions of the vent holes from which the high-temperature bleed air flows out during the leak are set by avoiding a position facing a member that is susceptible to heat. However, if a leak with a small flow rate in an initial stage of cracks or corrosion is not detected, and the leak is detected only after the flow rate of the bleed air flowing out from the vent hole is increased with the progress of the cracks or the corrosion, heat generated by the leak of the bleed air affects a larger area.

In accordance with the arrangement for detecting a leak in JP 2009-511884 A, the leak can be quickly detected. However, since the transmitting device/a receiving device of the high-frequency radiation, and an evaluation device are required, a cost of the arrangement is high. Particularly, it is not easy to construct an algorithm for appropriately evaluating the received high-frequency radiation and determining the occurrence of the leak. Thus, the arrangement cost is increased.

Thus, an object of the present invention is to provide a pipe structure that can reliably detect even a leak with a small flow rate corresponding to a defect in an initial stage of a pipe by using a line-shaped sensor without using an expensive device, and an aircraft including the pipe structure.

SUMMARY OF THE INVENTION

A pipe structure of the present invention includes: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; and a line-shaped sensor that passes a position corresponding to each of the plurality of vents, and is sensitive to a temperature or a concentration of a gaseous body outside the cover.

The present invention is featured in that the sensor includes a range in which the sensor rises upward from the position corresponding to at least one of the vents.

Here, when two sensors are used as the sensor, and one of the sensors is configured to cross the other of the sensors that extends along a length direction of the pipe at the position corresponding to at least one of the vents, it is possible to improve leak detection sensitivity while reducing a wiring length as compared to a case in which the respective sensors are wired so as to include the range in which the sensor rises upward.

A pipe structure of the present invention includes: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; and a line-shaped sensor that passes a position corresponding to each of the plurality of vents, and is sensitive to a temperature or a concentration of a gaseous body outside the cover.

The present invention is featured in that a surface area of the sensor in contact with a flow flowing out from the vents is increased by bending the sensor at the position corresponding to at least one of the vents.

A pipe structure of the present invention includes: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; and a line-shaped sensor that passes a position corresponding to each of the plurality of vents, and is sensitive to a temperature or a concentration of the gaseous body.

The present invention is featured in that the sensor has an outer portion that is disposed outside the cover, and an inner portion that continues from the outer portion and reaches at least one of voids communicating with the vents inside the cover. When the pipe structure of the present invention includes a heat insulating material that is interposed between the pipe and the cover, the inner portion may be configured to be in contact with the heat insulating material in which the voids are scattered.

The pipe structure of the present invention preferably includes a wind protection wall that blocks a flow of a gaseous body outside the cover that affects a flow of the gaseous body flowing out from the vents.

The pipe structure of the present invention preferably includes a guide member that guides the gaseous body flowing out from the vents toward the sensor.

The respective pipe structures described above preferably includes a heat insulating material that is interposed between the pipe and the cover.

An aircraft of the present invention includes one of the above pipe structures.

The present invention is suitable for a pipe structure through which bleed air from an engine or an auxiliary power unit that is a power source of the aircraft flows.

In the present invention, a method of wiring the sensor is devised as described above, or a device, such as the wind protection wall and the guide member, that prevents buoyancy and disturbance elements from affecting the flow flowing out from the vents is provided. Accordingly, it is possible to reliably detect even a leak with a small flow rate corresponding to a defect in an initial stage of the pipe while using a line-shaped (wire-shaped) sensor for which it is difficult to capture the flow flowing out from the vents of the cover without using an expensive device that electronically performs arithmetic operation or analysis.

BRIEF DESCRIPTION OF THE DRAWINGS

FIGS. 1A-1C are views illustrating a pipe structure according to a first embodiment in which FIG. 1A is a side view, FIG. 1B is a longitudinal-sectional view taken along a line Ib-Ib in FIG. 1A, and FIG. 1C is a cross-sectional view taken along a line Ic-Ic in FIG. 1A;

FIG. 6A is a view illustrating a wiring example of a sensor in a third embodiment, FIG. 6B is a cross-sectional view taken along a line Vb-Vb in FIG. 6A, and FIGS. 6C and 6D are views illustrating other wiring examples of the sensor;

DETAILED DESCRIPTION OF THE PREFERRED EMBODIMENTS

In the following, embodiments of the present invention will be described by reference to the accompanying drawings.

First Embodiment

Figure 1A:
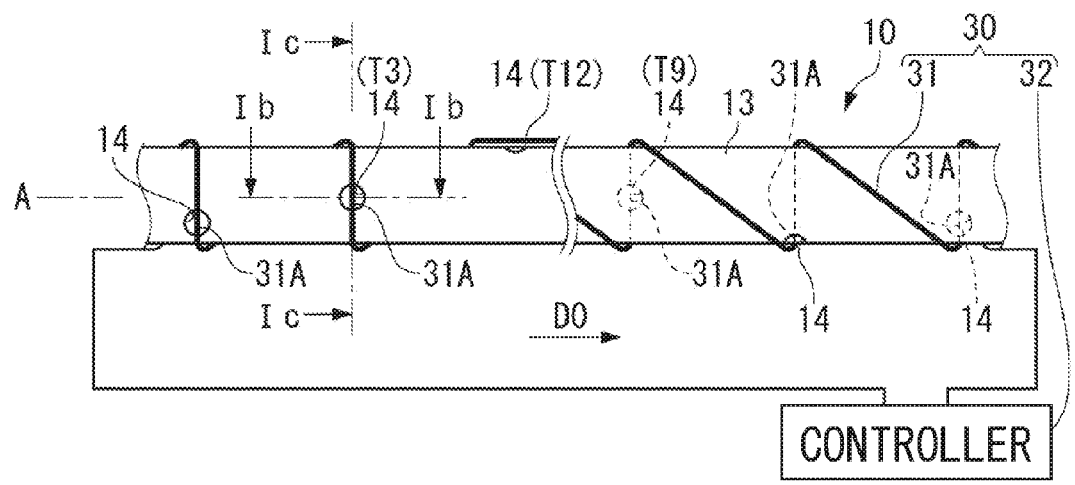

A pipe structure 10 shown in FIG. 1A supplies bleed air from an engine of an aircraft to an air conditioner, an anti-icing device, or the like.

The pipe structure 10 is disposed in a space prepared within a main wing or a fuselage of the aircraft, and is supported by a structural member constituting the main wing or the fuselage.

In the present specification, an "upper side" means an upper side in a vertical direction, and a "lower side" means a lower side in the vertical direction.

Also, in the present specification, a "horizontal direction" means a horizontal direction of the aircraft in a state in which the aircraft is parked on the ground.

The pipe structure 10 of a present embodiment is also applied to a structure that supplies bleed air from an auxiliary power unit that is provided at a rear end of the fuselage, to the air conditioner, the anti-icing device, or the like.

Figure 1B:
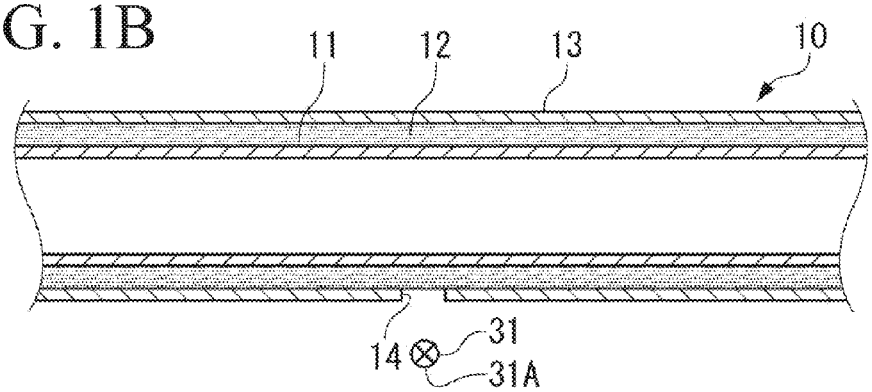

As shown in FIGS. 1A and 1B, the pipe structure 10 includes a pipe 11 through which the bleed air flows, a heat insulating material 12 and a cover 13 that cover an outer peripheral portion of the pipe 11, and a leak sensor 30 (a leak detector) that detects a leak of the bleed air from the pipe 11.

The leak sensor 30 has a line-shaped sensor 31 corresponding to a temperature sensor that is sensitive to a temperature, and a controller 32 that detects the leak based on electrical resistance of the sensor 31 (FIG. 1A).

The pipe 11 is formed of a metal material such as stainless steel. The pipe 11 may be divided into a plurality of pipes. The pipes are connected together by coupling.

Figure 1C:
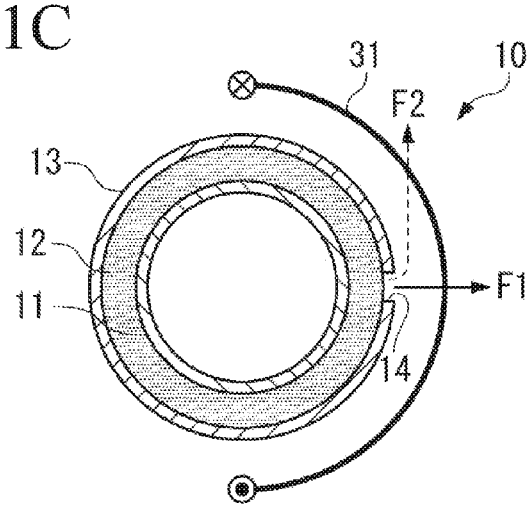

The high-temperature bleed air extracted from the engine continuously flows through the pipe 11. In order to keep the pipe 11 warm, and retain heat of the bleed air within the pipe 11, the outer peripheral portion of the pipe 11 is surrounded by the heat insulating material (FIGS. 1B and 1C).

The heat insulating material 12 has breathability. As the heat insulating material 12, various materials such as glass wool and urethane foam can be used.

The cover 13 covers the outer peripheral portions of the pipe 11 and the heat insulating material 12, and defines a leak-detecting vent hole 14 from which the bleed air leaking from the pipe 11 flows out.

For example, a cover formed of a composite material such as CFRP (carbon fiber reinforced plastics) can be used as the cover 13. When the cover 13 is formed in a ring shape in section, the cover 13 is easily fitted to the pipe 11. The pipe 11 and the cover 13 are disposed in a concentric manner.

As the vent hole 14, a plurality of vent holes are formed at intervals in a length direction of the cover 13 (a direction of an axis line A of the pipe 11) as shown in FIG. 1A. The respective vent holes 14 pass through the cover 13 in a thickness direction. Although the vent holes 14 are formed in a circular shape, the vent holes 14 may have another shape.

Each of the vent holes 14 is formed at one position on a circumference of the cover 13 (FIG. 1C).

The bleed air leaking from a defective portion such as cracks and corrosion generated at any position in the length direction and at any position in a circumferential direction in the pipe 11 reaches the vent hole 14 close to the defective portion through the heat insulating material 12 positioned between the outer peripheral portion of the pipe 11 and an inner peripheral portion of the cover 13, and flows out toward the line-shaped sensor 31 disposed outside the cover 13 via the vent hole 14. When a temperature of a portion 31A of the sensor 31 facing the vent hole 14 is increased by the bleed air, the electrical resistance of the sensor 31 is changed. Thus, the leak can be detected based on the change.

The leak sensor 30 (FIG. 1A) detects the leak of the bleed air collectively over an entire length of the pipe 11 based on the electrical resistance of the line-shaped sensor 31 that sequentially passes by the respective vent holes 14.

A width (a diameter) of the sensor 31 is smaller than a hole diameter of the vent holes 14, and for example, is several mm.

An element whose electrical characteristics are changed to cause a change in electrical resistance when a temperature of the element is increased can be appropriately used as the sensor 31.

The sensor 31 is arranged along the cover 13 so as to pass positions corresponding to the respective vent holes 14. The sensor 31 is supported at an interval from a surface of the cover 13 by brackets (not shown) that are disposed at appropriate intervals in the length direction. The brackets are fixed to structural members of an airframe or accessories. The interval between the sensor 31 and the cover 13 is, for example, several mm to several tens mm.

Members such as the structural members of the airframe and the accessories exist around the pipe structure 10. The vent holes 14 from which the high-temperature bleed air flows out during the leak are set at positions in the length direction of the cover 13 and at positions in the circumferential direction by avoiding a position facing a member that is susceptible to heat.

For example, a member formed of a composite material (a fiber reinforced resin) or aluminum alloy falls under the member that is susceptible to heat.

Here, the circumferential position of each of the vent holes 14 means a direction of the vent hole 14, that is, an angle (rotation) formed between a hole axis of the vent hole 14 and a reference position of the cover 13 (for example, T12 in FIG. 1A). In the present specification, the angle of the vent hole 14 is sometimes represented by "time" by assuming a cross sectional surface of the cover 13 to be a face of a clock.

When the vent hole 14 is positioned in the vicinity of, for example, a three o'clock position T3 or a nine o'clock position T9, the bracket for mounting the sensor 31 facing the vent hole 14 is easily mounted to a spar, a stringer, or the like that exists on a lateral side in a pipe installation space. However, members susceptible to heat are scattered in the small pipe installation space. Thus, it is often not possible to ensure a place for mounting the bracket in the vicinity of the three o'clock position T3 or the nine o'clock position T9. Therefore, the circumferential position (the angle, the rotation) of the vent hole 14 is not fixed.

When the vent hole 14 and the sensor 31 facing the vent hole 14 are sufficiently close to each other, a flow of the bleed air flowing out from the vent hole 14 (a leak flow) almost reliably reaches the sensor 31. However, depending on a mounting position of a clamp that supports the sensor 31, the vent hole 14 and the sensor 31 are away from each other. Thus, there is a possibility that the leak flow flowing out from the vent hole 14 deviates from the sensor 31, and the temperature of the sensor 31 is not increased to a temperature necessary for detection. A main cause thereof is buoyancy acting on the leak flow.

In order to solve the deviation of the leak flow from the sensor 31 due to the buoyancy, the pipe structure 10 of the present embodiment has a main feature in a direction of wiring of the sensor 31.

Figure 2A:
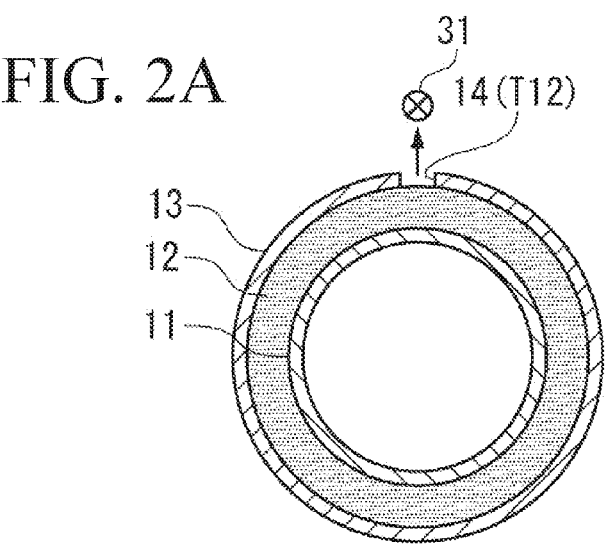
FIG. 2A is a cross-sectional view of the pipe structure at a position corresponding to a vent hole that is formed at an upper end of a pipe cover.
Figure 2B:
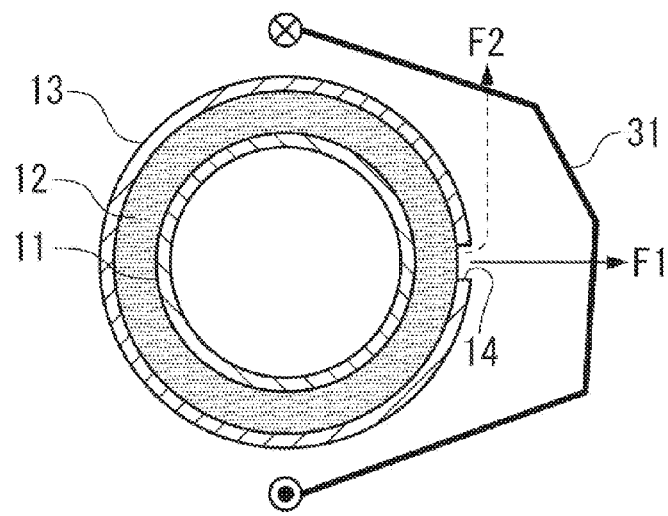
FIG. 2B is a view illustrating a wiring example of a sensor.

Here, in a case in which the vent hole 14 is positioned at an upper end (a twelve o'clock position) of the cover 13 as in the vent hole 14 that is assigned (T12) in FIG. 1A, the leak flow flowing out to the upper side along a hole axis direction from the vent hole 14 is guided by the buoyancy to directly reach the sensor 31 as indicated by a solid arrow in FIG. 2A even when the leak flow has a small flow rate. Therefore, the sensor 31 may be wired according to a typical method. The sensor 31 is wired along the length direction of the cover 13 as shown in FIGS. 1A and 2A at a position corresponding to the vent hole 14 (T12).

A case in which the vent hole 14 is positioned at a position other than the upper end of the cover 13 as in the vent holes 14 other than the vent hole 14 (T12) shown in FIG. 1A becomes a problem. In this case, when the leak flow flowing out along the hole axis from the vent hole 14 has a large flow rate, the leak flow directly travels along the hole axis direction as indicated by a solid arrow F1 in FIG. 1C. On the other hand, when the leak flow has a small flow rate, the buoyancy overcomes a pressure of the leak flow, and the leak flow is lifted up with respect to a surrounding gaseous body as indicated by a dashed arrow F2 in FIG. 1C. Thus, in a case in which the sensor 31 is wired along the length direction of the cover 13 at a position corresponding to the vent hole 14 and the leak flow has a small flow rate, the high-temperature gaseous body may not reach the sensor 31. In such a case, no leak is detected.

Therefore, in the present embodiment, the sensor 31 is wired so as to rise upward along an outer peripheral portion of the cover 13 as shown in FIGS. 1A and 1C at a position corresponding to each of the vent holes 14 other than the vent hole 14 (T12) positioned at the upper end of the cover 13. Accordingly, not only the leak flow F1 (the solid line in FIG. 1C) having a large flow rate, but the leak flow F2 (the dashed line in FIG. 1C) having a small flow rate can be also caused to reach the sensor 31. When the leak flow reaches the sensor 31, and the temperature of the sensor 31 is increased, the electrical resistance of the sensor 31 is changed. The controller (FIG. 1A) of the leak sensor 30 determines whether the temperature of the sensor 31 reaches a set temperature based on the electrical resistance of the sensor 31. When determining that the temperature reaches the set temperature, the controller 32 detects the leak.

Although the sensor 31 is wired along the circumferential direction of the cover 13 as shown in FIG. 1C in the present embodiment, it is not always necessary to wire the sensor 31 along the circumferential direction of the cover 13. As long as the leak flows F1 and F2 flowing out from the vent hole 14 reach the sensor 31, the sensor 31 may be wired in other ways.

The pipe 11 is installed along a horizontal direction DO in a section of the pipe 11 shown in FIGS. 1A to 1C. Thus, the sensor 31 rises so as to be perpendicular to the axis line A of the pipe 11 at the position corresponding to each of the vent holes 14 other than (T12).

Figure 4A:
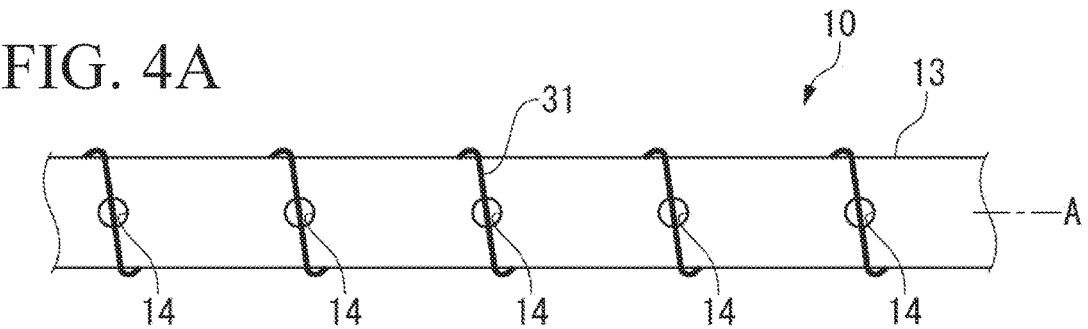
FIG. 4A is a view illustrating a wiring example of the sensor.

On the other hand, it is also allowed that the sensor 31 is wired in a direction inclined with respect to the axis line A of the pipe 11 at the position corresponding to each of the vent holes 14 as shown in FIG. 4A. In this case, the sensor 31 also rises upward at the position corresponding to the vent hole 14.

Figure 2C:
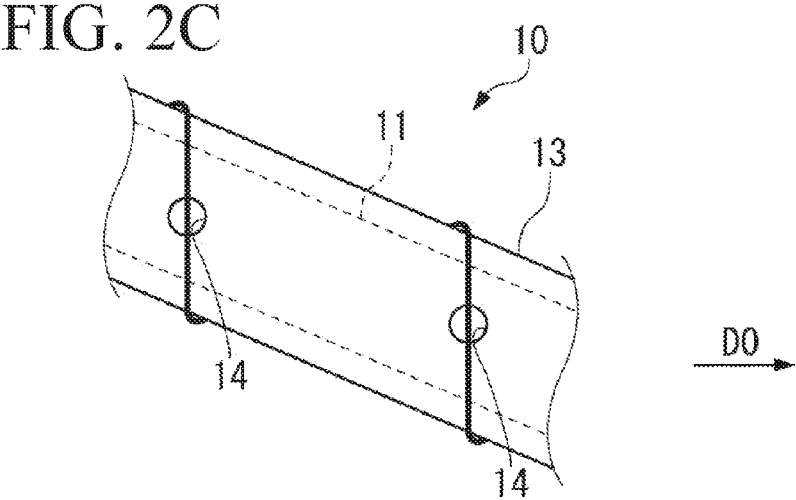
FIG. 2C is a view illustrating another wiring example of the sensor.

In a section in which the pipe 11 is installed so as to be inclined with respect to the horizontal direction DO as shown in FIG. 2C as well as the section in which the pipe 11 is installed along the horizontal direction DO, the sensor 31 may be wired so as to rise upward along the outer peripheral portion of the cover 13.

That is, the direction in which the pipe 11 to which the present embodiment is applied extends is not limited to the horizontal direction DO, and the installed pipe 11 may have any posture. When the pipe 11 is inclined with respect to the horizontal direction, the sensor 31 may be wired so as to rise at the position corresponding to the vent hole 14 regardless of the rotation of the vent hole 14.

The same applies to second to fifth embodiments.

In the present embodiment, the sensor 31 is wired over the half circumference from a lower end to the upper end (or from the upper end to the lower end) of the cover 13.

However, in consideration of only the point that the leak flow having a small flow rate that is affected by the buoyancy, and the leak flow having a larger flow rate are caused to reach the sensor 31, it is not necessary to wire the sensor 31 at a position below the vent hole 14, and where the lifted leak flow does not pass. That is, there exists a range in which the sensor 31 is to be intensively disposed.

Figure 3A:
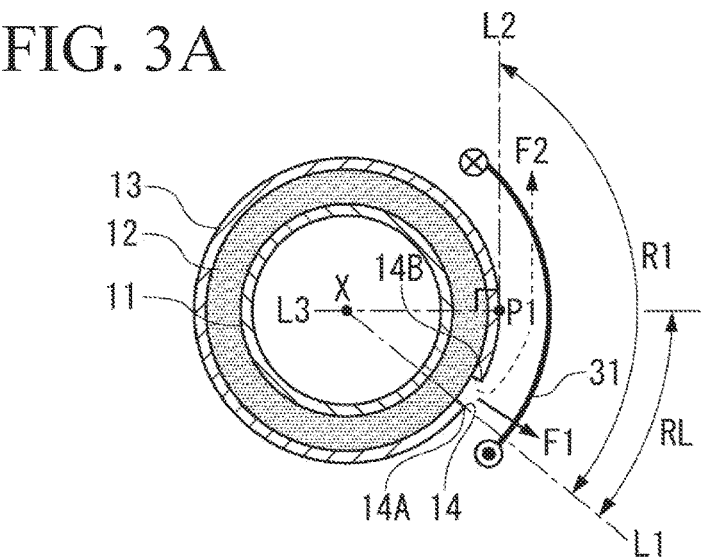
FIG. 3A is a cross-sectional view of the pipe structure at a vent hole that is formed below a three o'clock position of the pipe cover.
Figure 3B:
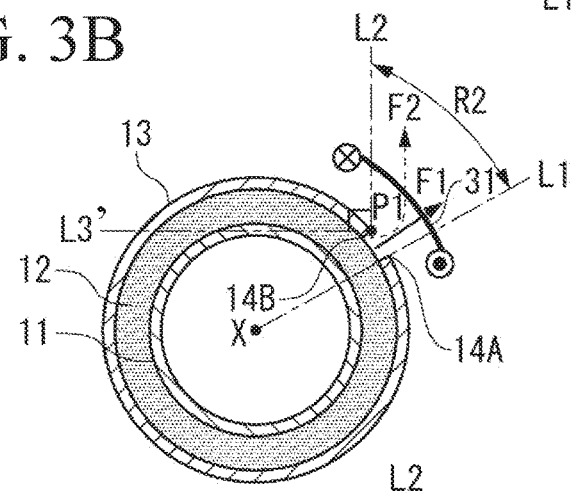
FIG. 3B is a cross-sectional view of the pipe structure at a vent hole that is formed above the three o'clock position of the pipe cover.

FIG. 3A shows a wiring example of a case in which the vent hole 14 is positioned below the three o'clock position of the cover 13, and FIG. 3B shows a wiring example of a case in which the vent hole 14 is positioned above the three o'clock position of the cover 13. In FIGS. 3A, 3B, the dashed arrow F2 indicates the lifted leak flow having a small flow rate, and the solid arrow F1 indicates the leak flow having a larger flow rate.

As shown in FIGS. 3A and 3B, both of the leak flow having a large flow rate (the solid arrow F1) and the leak flow having a small flow rate (the dashed arrow F2) do not flow downward of a lower edge 14A of the vent hole 14. In this case, the sensor 31 may not be wired below a straight line L1 that is drawn from a center X of the cross sectional surface of the cover 13 to the lower edge 14A of the vent hole 14. Here, the sensor 31 is wired up to a position slightly below the straight line L1 with a margin.

As shown in FIG. 3A, the leak flow flowing out from the vent hole 14 that is positioned below the three and nine o'clock positions rises along the outer peripheral portion of the cover 13 up to the three and nine o'clock positions. In order to efficiently increase the temperature of the sensor 31 by the leak flow immediately after flowing out, it is preferable to wire the sensor 31 along the circumferential direction of the cover 13 in a region RL below the three and nine o'clock positions. The leak flow is lifted up along the vertical direction in a region above the region RL since a course of the leak flow is not regulated by the cover 13.

As shown in FIGS. 3A and 3B, in a case where the leak flow having a small flow rate (the dashed arrow F2) does not flow upward of a straight line L2 that is drawn upward from a start point P1 at which the leak flow can start to be freely lifted up, the sensor 31 may not be wired above the straight line L2.

In FIG. 3A, the straight line L2 is a line perpendicular to a line L3 that is drawn so as to be a diameter of the cover 13 at the three and nine o'clock positions. A line L3' shown in FIG. 3B is drawn at an upper edge 14B of the vent hole 14 so as to be parallel to the above-mentioned L3 shown in FIG. 3A, and in FIG. 3B the straight line L2 is a line perpendicular to the line L3'. In both of FIGS. 3A and 3B, the sensor 31 is wired up to a position slightly above the straight line L2 with a margin.

Based on the above description, in the examples shown in FIGS. 3A and 3B, ranges R1 and R2 of an angle formed between the straight lines L1 and L2 fall under the range in which the sensor 31 is to be intensively disposed.

Here, in order to cause the leak flow having a large flow rate to reliably reach the sensor 31, it is necessary to set the straight line L1 to be at least below the upper edge 14B of the vent hole 14, and preferably below the lower edge 14A.

Figure 3C:
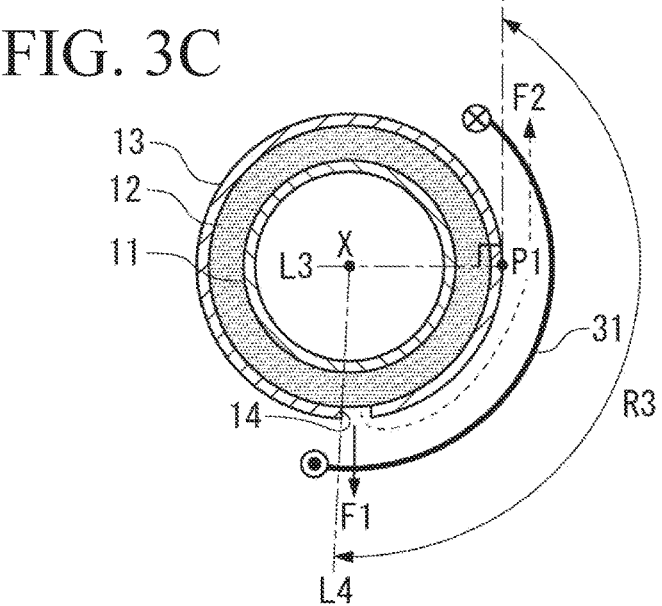
FIG. 3C is a cross-sectional view of the pipe structure at a vent hole that is formed at a six o'clock position of the pipe cover.

In a case in which the vent hole 14 is formed at a six o'clock position or in its vicinity as shown in FIG. 3C, the leak flow flowing out from the vent hole 14 is directly jetted downward as indicated by a solid arrow when the leak flow has a large flow rate. In this case, the sensor 31 may be disposed below the vent hole 14. Here, the sensor 31 is wired over a range R3 from the straight line L2 to a position L4 slightly past the vent hole 14.

In accordance with the present embodiment, the sensor 31 is wired so as to include the ranges R1, R2, and R3 in which the sensor 31 rises upward from the vent holes 14 of the cover 13, so that the leak flow having a small flow rate also reaches the sensor 31. It is thus possible for the leak sensor 30 to reliably detect the leak caused by a defective portion, such as cracks and corrosion, that has not been progressed yet by the leak sensor 30. By appropriately performing repair and replacement of the pipe 11 based on detection results by the leak sensor 30, reliability of a system including the pipe structure 10 and safety of the aircraft can be improved.

As long as the sensor 31 includes the range in which the sensor 31 rises upward from the position corresponding to the vent hole 14 formed in the cover 13, the sensor 31 can be arranged in any manner.

In a section of the pipe structure 10 in which the vent holes 14 are arranged in the length direction of the cover 13 as shown in FIG. 4A, the sensor 31 can be wired in a substantially helical shape around the cover 13.

Figure 4B:
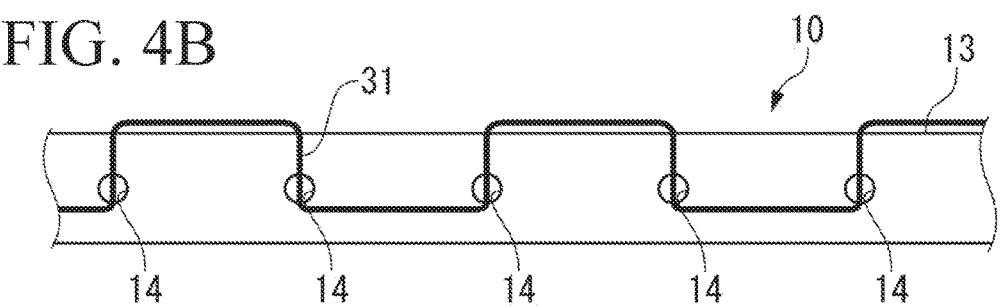
FIGS. 4B to 4D are similar views.

It is also possible to wire the sensor 31 intensively in an upper half of the cover 13 as shown in FIG. 4B.

Figure 4C:
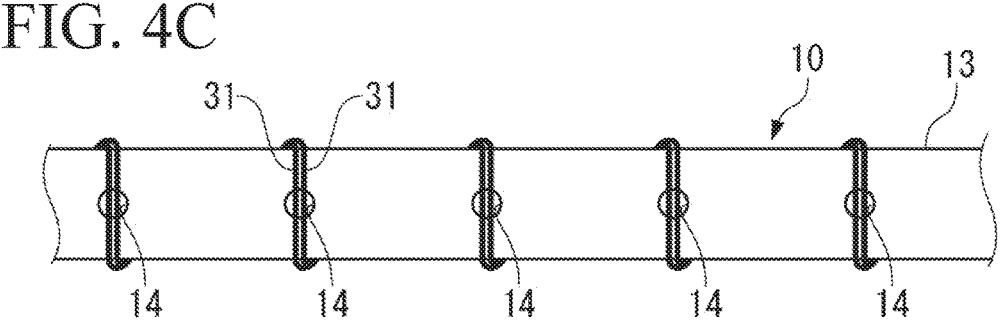
Figure 4D:
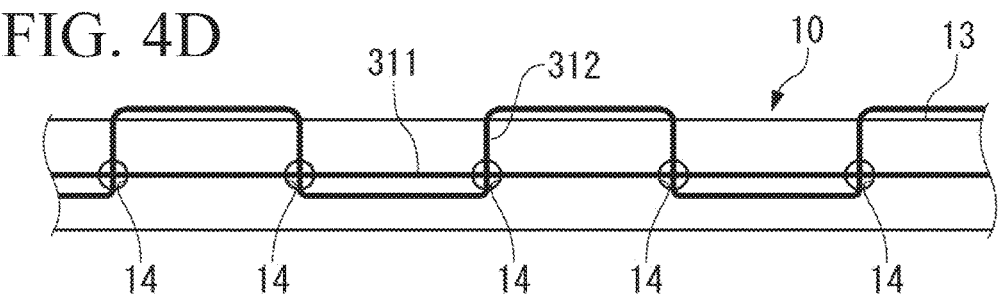

In order to ensure redundancy for disconnection or the like of the sensor 31 and also improve detection sensitivity of the sensor 31, it is preferable to duplicate the sensor 31 by using the two sensors 31. At this time, the two sensors 31 may be wired parallel to each other as shown in FIG. 4C, or one sensor 311 may be wired along the length direction of the cover and the other sensor 312 may be caused to cross the sensor 311 at the positions corresponding to the vent holes 14 as shown in FIG. 4D. In this case, the lifted leak flow having a small flow rate can be captured by the sensor 312 that is wired along the vertical direction at the positions of the vent holes 14. In accordance with a configuration shown in FIG. 4D, it is possible to improve the leak detection sensitivity while reducing a wiring length.

Second Embodiment

Next, the second embodiment of the present invention will be described.

In the following embodiment, points different from those of the first embodiment will be mainly described. The same constituent elements as those of the first embodiment are assigned the same reference numerals.

Similarly to the first embodiment, the second embodiment also provides measures for the problem that the leak flow deviates from the sensor 31 and the leak is not detected.

In the second embodiment, the sensor 31 is intensively disposed at a position where the leak flow flows by bending the sensor 31. A surface area of the sensor 31 in contact with the leak flow is thereby increased, so that the leak flow is captured.

Figure 5A:
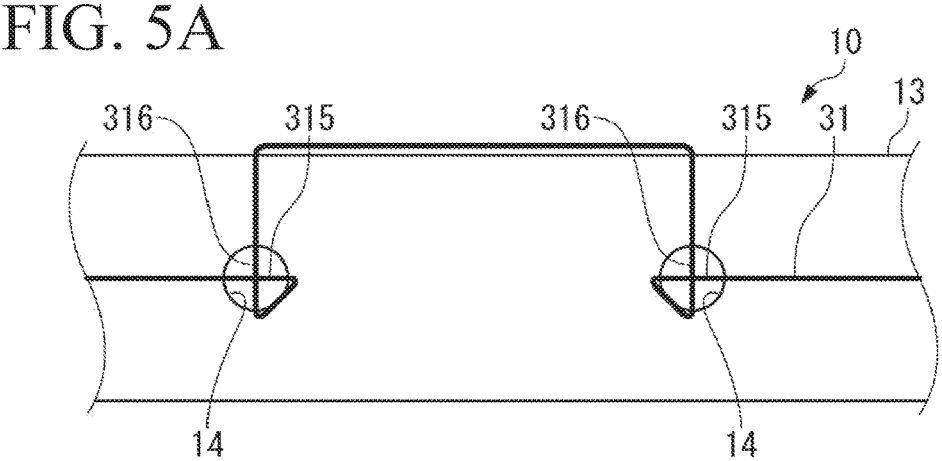
FIG. 5A is a view illustrating a wiring example of a sensor in a second embodiment.

In an example shown in FIG. 5A, the sensor 31 is bent to be disposed in a cross shape at the position corresponding to the vent hole 14. To be more specific, a section 315 of the sensor 31 passing by the vent hole 14 in the length direction of the cover 13, and a section 316 of the sensor 31 passing by the vent hole 14 in the vertical direction of the cover 13 are positioned within a range in which the vent hole 14 is projected in the hole axis direction (an opening range of the vent hole 14 in FIG. 5A).

By wiring the sensor 31 in the cross shape, the surface area of the sensor 31 in contact with the leak flow flowing out from the vent hole 14 is increased as compared to a case in which the sensor 31 is simply wired along the length direction of the cover 13 at the position corresponding to the vent hole 14. Even the leak flow having a small flow rate that tends to deviate from the sensor 31 due to disturbance such as movement of a gaseous body around the sensor 31 and fluctuations in temperature/pressure can be captured by the sensor with no deviation from the sensor 31 since the surface area of the sensor 31 is increased at the position corresponding to the vent hole 14. Thus, it is possible to improve the detection sensitivity of the leak sensor 30.

Moreover, the section 316 extending in the vertical direction of the sensor 31 to form the cross shape rises upward from the position corresponding to the vent hole 14. Thus, the leak flow lifted up from the vent hole 14 can be captured with no deviation from the sensor 31 similarly to the first embodiment.

Figure 5B:
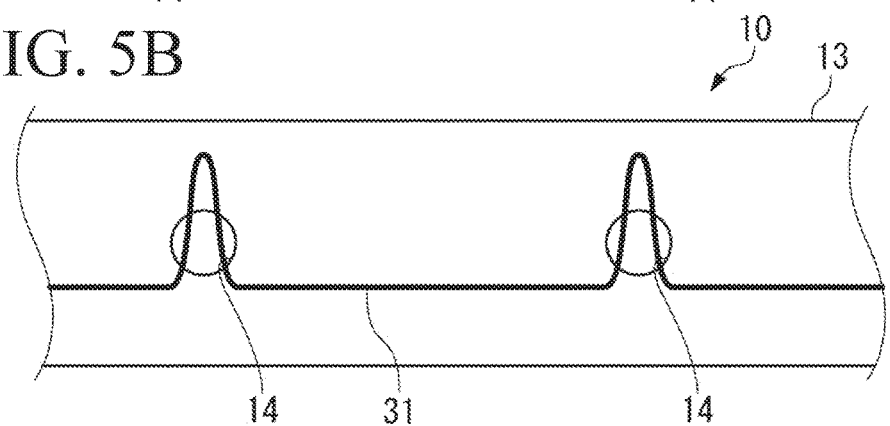
FIG. 5B is a view illustrating another wiring example.

Also, the surface area of the sensor 31 in contact with the leak flow flowing out from the vent hole 14 is also increased by bending the sensor 31 so as to meander along the vertical direction at the position corresponding to the vent hole 14 as in an example shown in FIG. 5B. A similar effect can be thereby obtained.

The sensor 31 may meander along the length direction of the cover 13 unlike in FIG. 5B. However, when the sensor 31 meanders along the vertical direction as in FIG. 5B, the sensor 31 rises upward from the position corresponding to the vent hole 14. Thus, the leak flow lifted up from the vent hole 14 can be captured with no deviation from the sensor 31 similarly to the first embodiment.

Figure 5C:
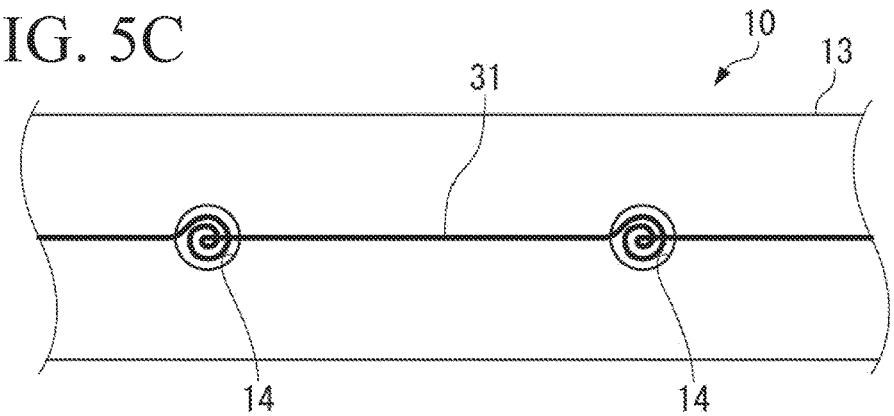
FIGS. 5C and 5D are similar views.
Figure 5D:
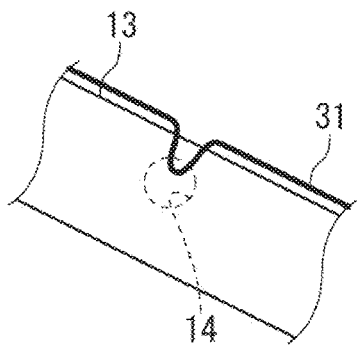

A portion of the sensor 31 shown in FIG. 5B may also be bent toward the vent hole 14 as shown in FIG. 5D. Accordingly, it is possible to capture the leak flow immediately after flowing out from the vent hole 14, so that the leak can be efficiently detected.

Moreover, the surface area of the sensor 31 in contact with the leak flow flowing out from the vent hole 14 is also increased by bending the sensor 31 in a spiral shape at the position corresponding to the vent hole 14 as shown in FIG. 5C. A similar effect can be thereby obtained.

The second embodiment can be applied to any of the plurality of vent holes 14 formed in the cover 13 regardless of the circumferential position (the angle, the rotation) of the vent hole 14 in the cover 13.

The portion of the sensor 31 formed in the cross shape, the meandering shape, and the spiral shape as shown in FIGS. 5A to 5D do not always need to be disposed within the range in which the vent hole 14 is projected along the hole axis direction. The portion of the sensor 31 may be disposed at an appropriate position with respect to the vent hole 14 (for example, slightly above the vent hole 14) in consideration of an influence of the buoyancy on the leak flow as well.

In the examples shown in FIGS. 5A to 5C, it is also possible to duplicate the sensor 31 by using the two sensors 31. In this case, machining for increasing the surface area in contact with the leak flow, such as the cross shape, the meandering shape, and the spiral shape, may be performed on both of the two sensors 31, or the machining may be performed on only one of the sensors 31 and may not be performed on the other sensor 31.

The same applies to the third to fifth embodiments. It is possible to optionally select whether respective features of the third to fifth embodiments are applied to both of the two sensors 31 or only one of the sensors 31.

In accordance with the second embodiment, the leak flow having a small flow rate can be also certainly captured by the sensor 31 similarly to the first embodiment. Thus, it is possible to reliably detect the occurrence of the leak regardless of the flow rate.

The wiring examples of the sensor 31 described in the first embodiment, and the form examples of the sensor 31 described in the second embodiment may be combined together. For example, the sensor 31 may be wired so as to meander in the vertical direction over the angle range R2 shown in FIG. 3B.

Third Embodiment

Next, the third embodiment of the present invention will be described by reference to FIGS. 6A-6D.

In the third embodiment, a portion of the sensor 31 is disposed inside the cover 13 in order to detect the leak with a small flow rate. The heat insulating material 12 (FIG. 6B) that surrounds the pipe 11 exists inside the cover 13.

As shown in FIGS. 6A and 6B, the sensor 31 of the present embodiment has an outer portion 313 that is wired outside the cover 13, and an inner portion 314 that continues from the outer portion 313 and is in contact with the heat insulating material 12 disposed inside the cover 13. The inner portion 314 enters the inside of the cover 13 via the vent hole 14.

In the present embodiment, a material having breathability, such as glass wool formed of glass fibers and open-cell foam (for example, urethane foam) formed of a resin material, is used as the heat insulating material 12.

The bleed air leaking from a defective portion such as cracks generated in the pipe 11 is directed to the vent hole 14 through the heat insulating material 12 that surrounds the pipe 11. As a process before the bleed air flows out from the vent hole 14, the bleed air is first spread over the heat insulating material 12. That the bleed air is spread over the heat insulating material 12 means spreading of the bleed air over voids S1 that are scattered in the heat insulating material 12, such as spaces between the glass fibers and open cells of the urethane foam constituting the heat insulating material 12. Accordingly, a temperature of the inner portion 314 of the sensor 31 is increased by the spread bleed air. It is thus possible to detect the leak by the leak sensor 30.

In accordance with the third embodiment, since the sensor 31 is not affected by wind around the sensor 31, the sensor 31 can detect even the leak with a very small flow rate inside the cover 13.

In the present embodiment, the heat insulating material 12 is cut such that the inner portion 314 of the sensor 31 reaches the inside of the heat insulating material 12, and the inner portion 314 of the sensor 31 is thereby embedded into the heat insulating material 12 as shown in FIG. 6B. A position into which the inner portion 314 is embedded is, for example, about a half of a thickness of the heat insulating material 12. This is because the sensor 31 is possibly sensitive to a temperature of the pipe 11 in which no leak occurs when the inner portion 314 is close to the pipe 11.

The present embodiment is not limited to the above form. The sensor 31 may be also in contact with a surface of the heat insulating material 12.

The bleed air leaking from the pipe 11 is not kept within the heat insulating material 12, but is also spread over an annular gap S2 (a space) between the outer peripheral portion of the heat insulating material 12 and the inner peripheral portion of the cover 13.

Therefore, when a portion of the sensor 31 is disposed inside the cover 13, the inner portion 314 of the sensor 31 may be inserted into the space S2 between the outer peripheral portion of the heat insulating material 12 and the inner peripheral portion of the cover 13 from the vent hole 14 as shown in FIG. 6C. Since the temperature of the inner portion 314 of the sensor 31 is increased by the bleed air spread over the gap S2, an effect similar to that of a configuration shown in FIGS. 6A and 6B can be obtained.

Alternatively, the sensor 31 may be wired over a substantially entire circumference of the space S2 as shown in FIG. 6D. The sensor 31 entering the inside of the cover 13 from the vent hole 14 substantially goes around the inside of the cover 13 through the space S2, and comes out of the cover 13 from the vent hole 14.

When the sensor 31 is disposed over substantially the entire circumference inside the cover 13 as described above, the leak can be detected with a temperature of even a portion of the inner portion 314 disposed in the space S2 being increased to a temperature necessary for detecting the leak even when there exists a temperature gradient in the circumferential direction.

The third embodiment can be applied to any of the plurality of vent holes 14 formed in the cover 13 regardless of the circumferential position (the angle, the rotation) of the vent hole 14 in the cover 13.

Fourth Embodiment

Next, the fourth embodiment of the present invention will be described by reference to FIGS. 7A-7D.

The pipe structure according to the fourth embodiment includes a wind protection wall 15 (FIGS. 7A and 7B) that blocks wind against the leak flow flowing out from the vent hole 14 in order to avoid a decrease in the leak detection sensitivity due to wind around the pipe structure.

For example, the wind around the pipe structure is generated by ventilation of the pipe installation space, or movement of a gaseous body due to a temperature gradient or a pressure gradient in the space. The wind flows in a direction crossing the hole axis direction of the vent hole 14 that defines an original direction of the leak flow.

In order to prevent the leak flow particularly having a small flow rate from deviating from the sensor 31 according to the wind direction, the wind protection wall 15 projects from the surface of the cover 13 where the vent hole 14 is formed.

Figure 7A:
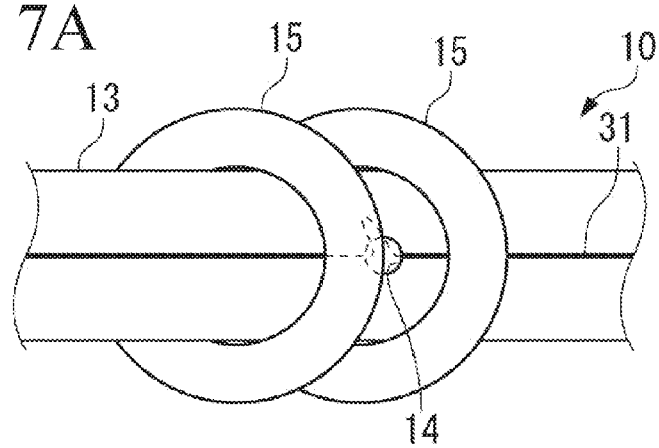
FIG. 7A is a perspective view illustrating a pipe structure according to a fourth embodiment.
Figure 7B:
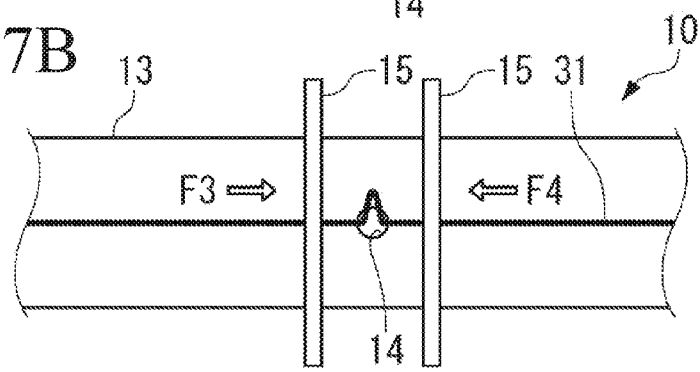
FIG. 7B is a side view of the pipe structure shown in FIG. 7A.

In an example shown in FIGS. 7A and 7B, the sensor 31 is wired along the length direction of the cover 13 at a predetermined interval from the surface of the cover 13. The sensor 31 passes through the wind protection wall 15. The sensor 31 is also bent so as to meander at the position corresponding to the vent hole 14 as described by reference to FIG. 5B. The present embodiment is not limited to the above form, and other forms, for example, as shown in FIGS. 5A, 5C, and 5D may be applied.

In the present embodiment, the wind protection wall 15 is formed in an annular shape, and is fitted to the cover 13 so as to surround the outer peripheral portion of the cover 13. The wind protection wall 15 is disposed on opposite sides of the vent hole 14 in the length direction of the cover 13. The wind protection walls 15 can block both of wind F3 directed to the vent hole 14 from a left side, and wind F4 directed to the vent hole 14 from a right side in FIG. 7B.

In accordance with the present embodiment, the leak flow having a small flow rate can be also caused to reach the sensor 31 by blocking the wind F3 and the wind F4 around the pipe structure by the wind protection walls 15. It is thus possible to reliably detect the leak occurring in the pipe 11.

The wind protection walls 15 preferably project at least to a position of the sensor 31 from the surface of the cover 13 such that the leak flow reliably reaches the sensor 31 without deviating. The wind protection walls 15 of the present embodiment project to a position exceeding the sensor 31 that traverses the vent hole 14.

The wind protection walls 15 only need to be provided at the vent hole 14 and in its vicinity in order to block the wind against the leak flow. A portion not required for blocking the wind against the leak flow may be removed by, for example, forming the wind protection walls 15 in a C shape.

Also, the wind protection walls 15 only need to be provided at a necessary position according to the direction of the wind to be blocked that affects the leak flow. The wind protection wall 15 may be provided only on one side of the vent hole 14.

Figure 7C:
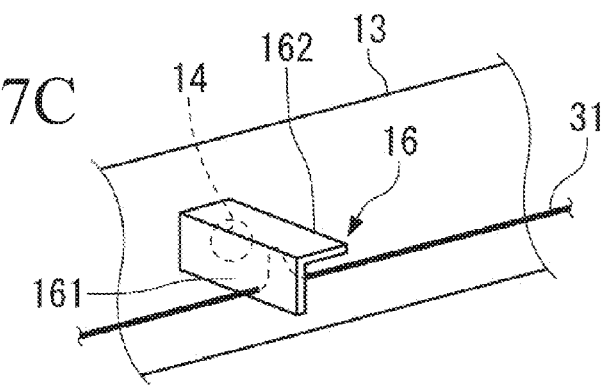
FIG. 7C is a view illustrating a modification of a wind protection wall.

When the wind flows upward or downward along the vertical direction of the cover 13, a wind protection wall that is positioned above or below the vent hole 14 can be provided. For example, a wind protection wall 16 including a side wall 161 and an upper wall 162 can be formed as shown in FIG. 7C.

The wind protection wall 16 may be provided on the cover 13 or on the sensor 31.

The fourth embodiment can be applied to any of the plurality of vent holes 14 formed in the cover 13 regardless of the position (the angle, the rotation) of the vent hole 14.

The fourth embodiment can be appropriately combined with the respective configurations described in the first and second embodiments.

Figure 7D:
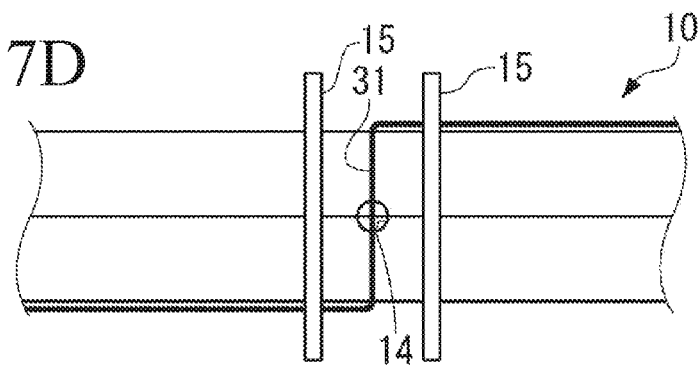
FIG. 7D is a view illustrating a wiring example of a sensor.

For example, the sensor 31 may be wired so as to rise upward from the position corresponding to the vent hole 14 similarly to the first embodiment between the wind protection walls 15 and 15 as shown in FIG. 7D.

Fifth Embodiment

Next, the fifth embodiment of the present invention will be described by reference to FIGS. 8A-8F.

The pipe structure according to the fifth embodiment includes a guide member 17 that guides the leak flow flowing out from the vent hole 14 to the sensor 31.

Figure 8A:
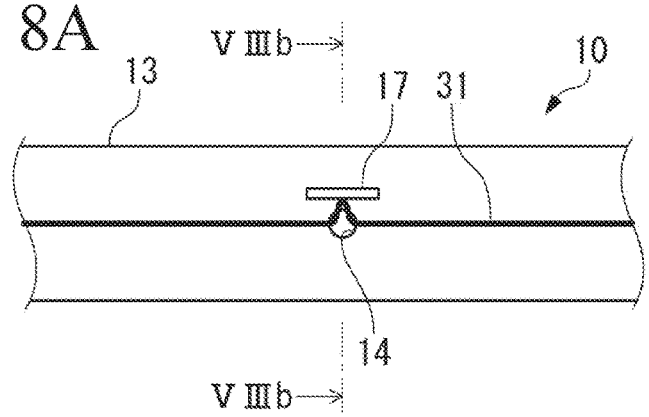
FIG. 8A is a side view illustrating a pipe structure according to a fifth embodiment.
Figure 8B:
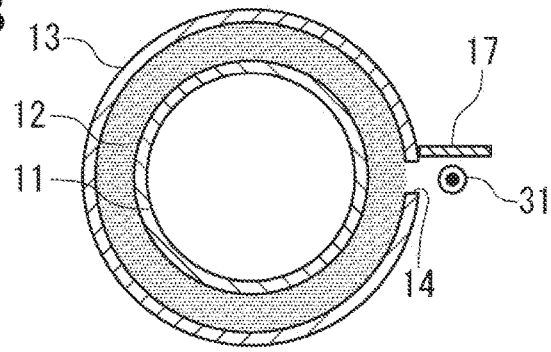
FIG. 8B is a cross-sectional view taken along a line VIIIb-VIIIb in FIG. 8A, FIGS. 8C and 8D are views illustrating a modification of the fifth embodiment.

In an example shown in FIGS. 8A and 8B, the sensor 31 is wired along the length direction of the cover 13 at a predetermined interval from the surface of the cover 13. The sensor 31 is also bent so as to meander at the position corresponding to the vent hole 14 as described by reference to FIG. 5B. The present embodiment is not limited to the above form, and other forms, for example, as shown in FIGS. 5A, 5C, and 5D may be applied.

The guide member 17 is formed in a plate shape, projects from the surface of the cover 13, and is disposed above the vent hole 14 as shown in FIGS. 8A and 8B.

The guide member 17 mainly corresponds to the leak flow that is lifted up by the influence of the buoyancy. The guide member 17 preferably projects at least to the position of the sensor 31 from the surface of the cover 13 such that the leak flow reliably reaches the sensor 31 without deviating. The guide member 17 of the present embodiment projects to the position exceeding the sensor 31 that traverses the vent hole 14.

The lifting of the leak flow flowing out from the vent hole 14 is restricted by the guide member 17, so that the leak flow reaches the sensor 31 that is positioned below the guide member 17.

Therefore, it is possible to reliably detect even the leak flow having a small flow rate that is easily affected by the buoyancy.

Figure 8C:
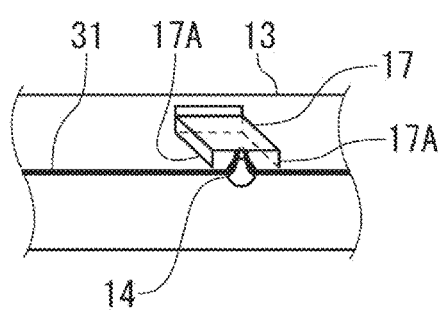
FIGS. 8E and 8F are views illustrating another modification of the fifth embodiment.
Figure 8D:
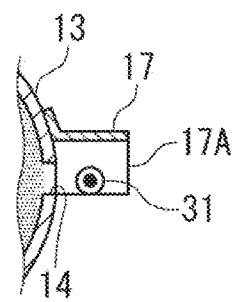

The guide member 17 may be also formed such that an outer periphery 17A along the hole axis direction of the vent hole 14 projects downward as shown in FIGS. 8C and 8D.

Accordingly, the outer periphery 17A can guide the leak flow flowing to a lower side of the guide member 17 toward the sensor 31 without letting the leak flow escape from the lower side of the guide member 17.

Figure 8E:
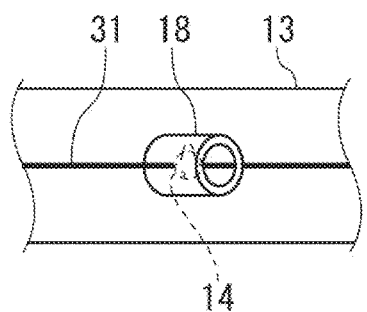
Figure 8F:
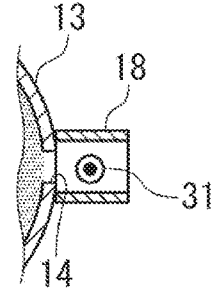

Moreover, a guide tube 18 formed in a tubular shape may be used as shown in FIGS. 8E and 8F.

The guide tube 18 surrounds the vent hole 14, and projects from the surface of the cover 13. The sensor 31 is wired so as to pass through a wall of the guide tube 18 in a thickness direction.

The leak flow flowing out from the vent hole 14 is guided to the sensor 31 along an axial direction of the guide tube 18 while the lifting of the leak flow is restricted by the wall of the guide tube 18.

When the guide tube 18 is used, it is possible to avoid the deviation of the leak flow from the sensor 31 due to disturbance such as movement of a surrounding gaseous body in addition to the influence of the buoyancy.

An inner diameter of the guide tube 18 can be appropriately set in consideration of a pressure loss of the leak flow. Although the inner diameter is set to be slightly larger than the hole diameter of the vent hole 14 in an example shown in FIGS. 8E and 8F, the inner diameter may be also set to be equal to the hole diameter of the vent hole 14.

The fifth embodiment can be applied to any of the plurality of vent holes 14 formed in the cover 13 regardless of the position (the angle, the rotation) of the vent hole 14.

The direction in which the guide member 17 and the guide tube 18 project from the surface of the cover 13 is not limited to the direction along the hole axis of the vent hole 14. The guide member 17 and the guide tube 18 may project in a direction inclined with respect to the hole axis.

Two or more embodiments appropriately selected from the first to fifth embodiments described above may be combined together.

The constitutions described in the aforementioned embodiments may be also freely selected or appropriately changed into other constitutions without departing from the gist of the present invention.

It is not essential that the heat insulating material 12 is interposed between the pipe 11 and the cover 13. Even when the outer peripheral portion of the pipe 11 is directly covered by the cover 13 as shown in FIG. 9, the methods of wiring the sensor 31 described in the first to third embodiments, and the devices (the wind protection wall, the guide member) used for the pipe structure described in the fourth and fifth embodiments can be applied.

Figure 9:
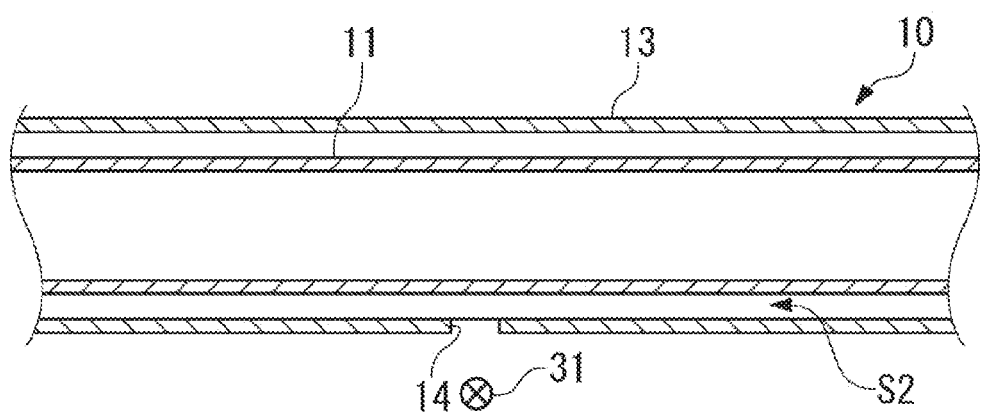
FIG. 9 is a longitudinal-sectional view illustrating a pipe structure according to a modification of the present invention.

When a portion of the sensor 31 (the inner portion 314) is disposed as described in the third embodiment (FIGS. 6A-6D) in the space S2 between the outer peripheral portion of the pipe 11 and the inner peripheral portion of the cover 13 shown in FIG. 9, an effect similar to that of the third embodiment can be obtained.

The pipe structure of the present invention is not limited to the structure through which the bleed air from the engine or the auxiliary power unit flows. The present invention can be also applied to a pipe structure through which another high-temperature gas flows.

Also, the present invention is not limited to the aircraft, and can be applied to a pipe structure provided in various industrial plants.

Furthermore, the sensitive section used for the leak detection is not limited to the temperature sensor that is sensitive to a temperature of a gaseous body in a space to which the gaseous body leaks, and a concentration sensor that is sensitive to a concentration of a gaseous body may be also employed.

What is claimed is:

1. A pipe structure comprising:
   a pipe through which a gaseous body having a higher temperature than a temperature of a surrounding atmosphere flows;
   a cover that covers an outer peripheral portion of the pipe, and defines a plurality of vents from which the gaseous body leaking from the pipe flows out; and
   a line-shaped sensor that passes a position corresponding to each of the plurality of vents, and is sensitive to a temperature or a concentration of a gaseous body outside the cover,
   wherein the sensor includes a range in which the sensor rises upward from the position corresponding to at least one of the vents.

2. The pipe structure according to claim 1,
   wherein two sensors are used as the sensor, and
   one of the sensors crosses the other of the sensors that extends along a length direction of the pipe at the position corresponding to at least one of the vents.

3. The pipe structure according to claim 1, further comprising a wind protection wall that blocks a flow of a gaseous body outside the cover that affects a flow of the gaseous body flowing out from at least one of the vents.

4. The pipe structure according to claim 1, further comprising a guide member that guides the gaseous body flowing out from at least one of the vents toward the sensor.

5. The pipe structure according to claim 1, further comprising a heat insulating material that is interposed between the pipe and the cover.

6. An aircraft comprising the pipe structure according to claim 1.

7. The aircraft according to claim 6, wherein the gaseous body flowing through the pipe is bleed air from an engine or an auxiliary power unit that is a power source of the aircraft.

8. A pipe structure comprising:
   a pipe through which a gaseous body having a higher temperature than a temperature of a surrounding atmosphere flows;
   a cover that covers an outer peripheral portion of the pipe, and defines a plurality of vents from which the gaseous body leaking from the pipe flows out;
   a line-shaped sensor that passes a position corresponding to each of the plurality of vents, and is sensitive to a temperature or a concentration of a gaseous body outside the cover; and
   a wind protection wall that blocks a flow of a gaseous body outside the cover that affects a flow of the gaseous body flowing out from at least one of the vents,
   wherein a surface area of the sensor in contact with a flow flowing out from the vent is increased by bending the sensor at the position corresponding to at least one of the vents.

9. The pipe structure according to claim 8, further comprising a guide member that guides the gaseous body flowing out from at least one of the vents toward the sensor.

10. The pipe structure according to claim 8, further comprising a heat insulating material that is interposed between the pipe and the cover.

11. An aircraft comprising the pipe structure according to claim 8.

12. The aircraft according to claim 11, wherein the gaseous body flowing through the pipe is bleed air from an engine or an auxiliary power unit that is a power source of the aircraft.

13. A pipe structure comprising:
- a pipe through which a gaseous body having a higher temperature than a temperature of a surrounding atmosphere flows;
- a cover that covers an outer peripheral portion of the pipe, and defines a plurality of vents from which the gaseous body leaking from the pipe flows out; and
- a line-shaped sensor that passes a position corresponding to each of the plurality of vents, and is sensitive to a temperature or a concentration of the gaseous body,
- wherein the sensor has an outer portion that is disposed outside the cover, and an inner portion that continues from the outer portion and reaches inside the cover to at least one of a plurality of voids communicating with the vents.

14. The pipe structure according to claim 13, further comprising a heat insulating material that is interposed between the pipe and the cover,
- wherein the inner portion is in contact with the heat insulating material in which the plurality of voids are scattered.

15. An aircraft comprising the pipe structure according to claim 13.

16. The aircraft according to claim 15, wherein the gaseous body flowing through the pipe is bleed air from an engine or an auxiliary power unit that is a power source of the aircraft.

* * * * *